(No Model.) 2 Sheets—Sheet 2.
M. L. SEVERY.
APPARATUS FOR MOUNTING AND OPERATING THERMOPILES.
No. 527,377. Patented Oct. 9, 1894.
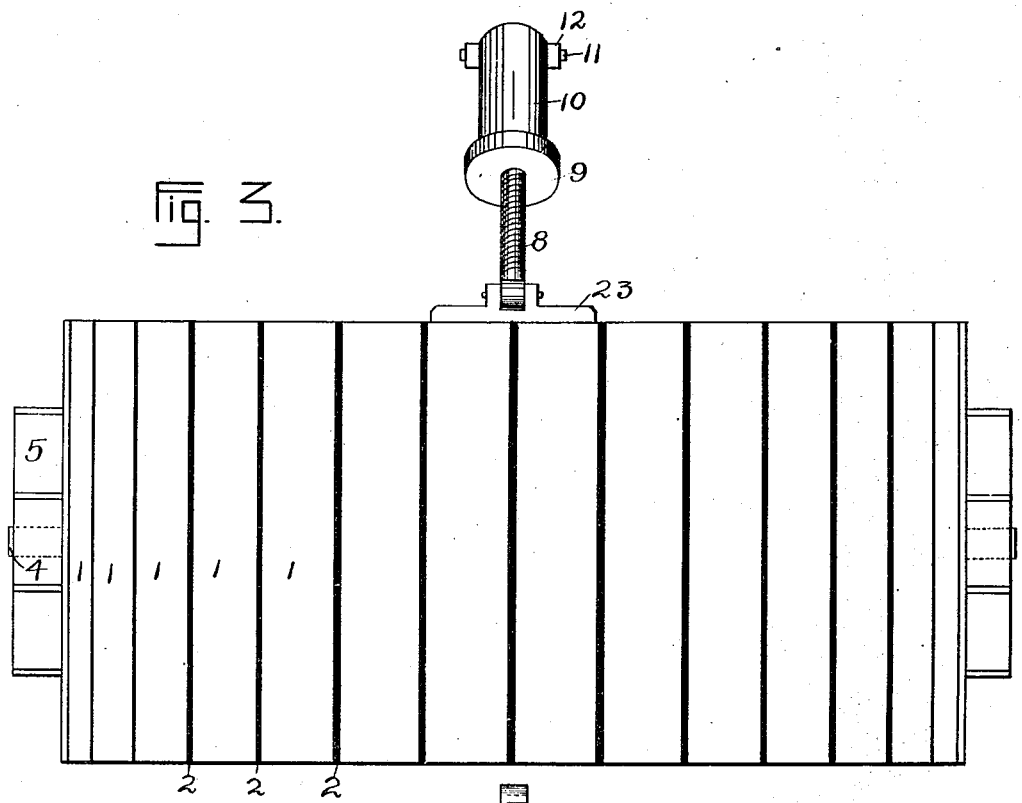
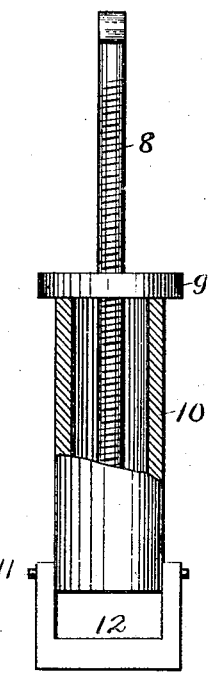
Witnesses.
Arthur B. Mudge
J. H. Robinson
Inventor.
Melvin L. Severy,
by Howe & Kellogg
Attorneys.

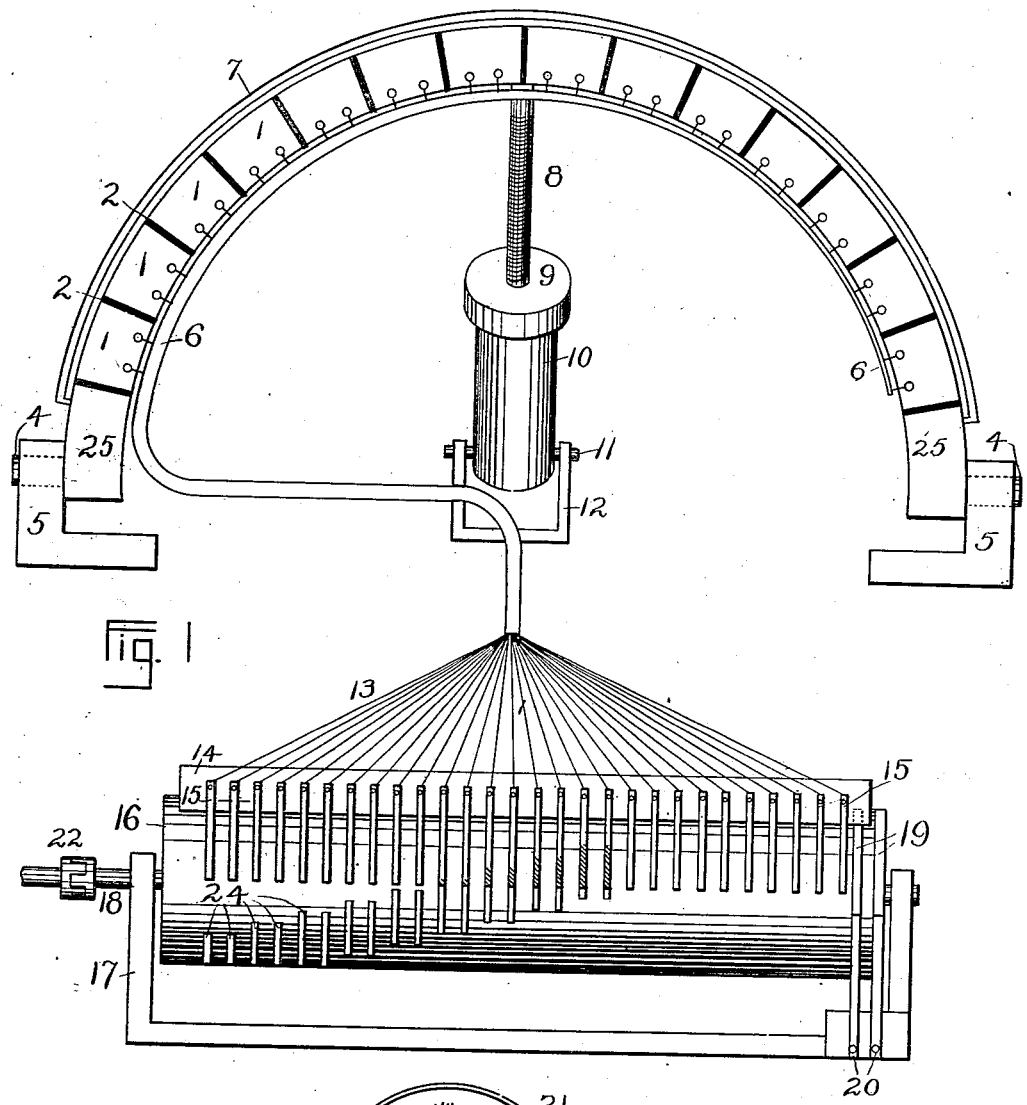

UNITED STATES PATENT OFFICE.

MELVIN L. SEVERY, OF BOSTON, ASSIGNOR OF ONE-HALF TO FRANCIS DOANE, OF NORWOOD, MASSACHUSETTS.

APPARATUS FOR MOUNTING AND OPERATING THERMOPILES.

SPECIFICATION forming part of Letters Patent No. 527,377, dated October 9, 1894.

Application filed February 16, 1894. Serial No. 500,385. (No model.)

*To all whom it may concern:*

Be it known that I, MELVIN L. SEVERY, a citizen of the United States, residing in Boston, in the county of Suffolk and State of Massachusetts, have invented certain new and useful Improvements in Apparatus for Mounting and Operating Thermopiles, of which the following, taken in connection with the accompanying drawings, is a specification.

This invention relates to devices for the production of electricity by the action of solar heat upon a thermo-pile, and has for its object the constant production of an electric current during the apparent diurnal and annual movements of the sun, without the necessity of moving said thermo-pile in accordance with the apparent movements of the sun.

To this end the invention consists in the combination, substantially as hereinafter more fully set forth, of a series of thermopiles arranged consecutively upon a semi-circular frame, which frame is capable of a movement at an angle to the plane of the horizon, and arranged on a line running substantially east and west, and at an angle which is a mean between the winter and summer declination of the sun; mechanism for effecting said angular movement; a revolving commutator, actuated by a clock keeping solar time, and moving synchronously with the hour hand of said clock; a series of pairs of contact points arranged spirally on said commutator and connected to the motor or other device to be operated by the current, and a series of corresponding pairs of brushes, each connected respectively to the terminals of a thermopile and successively brought in contact with the contact points on the commutator during its rotation.

In the accompanying drawings, Figure 1 is an elevation of an apparatus constructed in accordance with the principle of my invention. Fig. 2 is an elevation of the solar clock and the clutch for connecting said clock with the shaft carrying the commutator. Fig. 3 is a plan view showing the arrangement of the thermo-piles, and Fig. 4 is a detail view showing the construction of the mechanism for moving the pile.

In the several figures, like numerals refer to like parts.

Referring to the drawings, 25 is a semi-circular frame arranged on a line running substantially east and west, and supported at each end by suitable trunnions in vertical standards. This frame is preferably permanently set at an angle to the plane of the horizon which is equal to the mean between the angles of the sun's winter and summer declination, but it may be made to follow the annual movement of the sun, and to this end mechanism is provided which will be hereinafter described for effecting this movement. Upon this frame are arranged consecutively a series of suitable thermo-piles —1—. The form of thermo-pile which I prefer is that described and claimed in another application filed herewith, but any form may be used. These piles are suitably insulated from each other as at 2, and the faces of the piles are covered with some material which is transparent to the direct heat rays of the sun, but opaque to dark radiated heat.

From the terminals of each pile are suitable insulated conductors which may be brought together to form a cable —6— and each connected respectively to a corresponding brush —15— on the insulated bar 14. Under these brushes there is placed a suitable rotating commutator having thereon a series of pairs of insulated contact points —24— which are connected alternately to two insulated rings —19— which surround the commutator so that the positive poles are connected to one ring and the negative poles to the other. Bearing on these rings are suitable brushes —20— by means of which the current is conveyed to the point where it is to be utilized. In the rotation of the commutator each pair of contact points makes contacts successively with the corresponding pair of brushes, each respectively connected with one of the terminals of the pile, and consequently, during the rotation of the commutator the entire series of piles are connected to the rings 19, and through them to the point where the current is to be utilized. The rotation of this commutator is effected synchronously with the diurnal movement of the sun, by connecting it to a clock keeping solar time. This connection may be made by means of a clutch —22— which will allow different commutators to be used in which the connections between the contact points 24 and the rings 19 are different, so that the different thermo-piles composing the source of power may be connected to the rings 19 in any desired combination.

Each pile of the series is consecutively exposed to the effect of the sun's rays during the apparent diurnal movement of the sun, and by means of the commutator rotating synchronously with the movement of the sun, each exposed pile is connected with the rings 19, and a constant current is delivered to the place where it is to be utilized.

The inclination of the frame may be varied in accordance with the sun's altitude at the different seasons of the year, by means of the screw 8 which is pivoted at one end to the side of the case as shown at 23, and turns in a nut —9— on a cylinder —10— which is pivoted at 11 to the standard 12. I have shown this device as a convenient means for moving the frame, but any other device which will accomplish the desired result may be used.

Having thus described my invention, what I claim, and desire to secure by Letters Patent of the United States, is—

1. A series of thermo-piles insulated from one another and arranged side by side upon a semi-circular frame mounted on a line running substantially east and west; a series of brushes or other contact points arranged in pairs and insulated from each other; electrical connection between said pairs of brushes and the terminals of each pile; a commutator moving synchronously with the apparent diurnal movement of the sun; a series of contact points on said commutator arranged in pairs and each pair successively making contact with the corresponding pair of brushes, and electrical connection between the contact points on said commutator and the point where the current is to be utilized, substantially as set forth.

2. A series of thermo-piles insulated from one another and arranged side by side upon a semi-circular frame mounted on a line running substantially east and west; a series of brushes or other contact points arranged in pairs and insulated from each other; electrical connection between said pairs of brushes and the terminals of each pile; a commutator moving synchronously with the apparent diurnal movement of the sun; a series of contact points on said commutator arranged in pairs and each pair successively making contact with the corresponding pair of brushes; electrical connection between the contact points on said commutator and the point where the current is to be utilized, and a clock keeping solar time and moving said commutator, substantially as set forth.

3. The combination, substantially as set forth, of a semi-circular frame supported in a plane extending substantially east and west at an angle to the plane of the horizon and capable of movement whereby said angle may be varied; mechanism for effecting this movement of the frame, and a series of thermo-piles arranged side by side upon the periphery of the frame.

4. The combination, substantially as set forth, of the frame 3; the trunnions 4 on each end of the same; the vertical supports 5; the thermo-piles 1, 1; the glass jacket 7; the threaded rod 8 pivoted to the side of the frame; the nut 9 on the rod 8; and the cylinder 10 pivoted at 11 to the support 12.

In testimony whereof I have hereunto subscribed my name this 9th day of February, A. D. 1894.

MELVIN L. SEVERY.

Witnesses:
CHAS. A. KELLOGG,
ARTHUR C. MUDGE.